US011635768B2

United States Patent
Singh et al.

(10) Patent No.: US 11,635,768 B2
(45) Date of Patent: Apr. 25, 2023

(54) SYSTEM FOR COORDINATING CONTROL OF MULTIPLE WORK VEHICLES

(71) Applicant: CNH Industrial America LLC, New Holland, PA (US)

(72) Inventors: Aditya Singh, Bolingbrook, IL (US); Yaseen Suleman, Glendale Heights, IL (US); Navneet Gulati, Naperville, IL (US); Daniel Geiyer, Bolingbrook, IL (US); Phillip Duane Dix, Darien, IL (US)

(73) Assignee: CNH Industrial America LLC, New Holland, PA (US)

( * ) Notice: Subject to any disclaimer, the term of this patent is extended or adjusted under 35 U.S.C. 154(b) by 176 days.

(21) Appl. No.: 17/243,147

(22) Filed: Apr. 28, 2021

(65) Prior Publication Data
US 2021/0333802 A1    Oct. 28, 2021

Related U.S. Application Data

(60) Provisional application No. 63/016,694, filed on Apr. 28, 2020.

(51) Int. Cl.
*G05D 1/02* (2020.01)
*B60W 10/04* (2006.01)
(Continued)

(52) U.S. Cl.
CPC .......... *G05D 1/0287* (2013.01); *A01B 69/008* (2013.01); *A01D 57/20* (2013.01);
(Continued)

(58) Field of Classification Search
CPC ............... G05D 1/0287; G05D 1/0223; G05D 2201/0201; G05D 1/0295; G05D 1/0293;
(Continued)

(56) References Cited

U.S. PATENT DOCUMENTS

| 7,644,816 B2 | 1/2010 | Veiga Leal et al. |
| 8,126,620 B2 | 2/2012 | Ringwald et al. |
| (Continued) | | |

FOREIGN PATENT DOCUMENTS

| EP | 1219153 | 7/2020 |
| WO | 2019173256 | 9/2019 |

OTHER PUBLICATIONS

Potter, "Design and Assessment of an Automated Grain Auger Position Control System," 2012, https://pdfs.semanticscholar.org/e2a2/f9170579b1437cc36440953facd3b7c79403.pdf.

*Primary Examiner* — Jonathan M Dager
*Assistant Examiner* — Jean W Charleston
(74) *Attorney, Agent, or Firm* — Rickard DeMille; Rebecca Henkel

(57) ABSTRACT

A control system includes a controller configured to determine a target speed between a first target position of a haul vehicle relative to a harvester and a second target position of the haul vehicle relative to the harvester based on a flow rate of agricultural product through a conveyor of the harvester. The haul vehicle is coupled to a storage compartment, an outlet of the conveyor is aligned with a first unloading point within the storage compartment while the haul vehicle is positioned at the first target position, and the outlet of the conveyor is aligned with a second unloading point within the storage compartment while the haul vehicle is positioned at the second target position. Furthermore, the controller is configured to output a control signal indicative of instructions to direct the haul vehicle from the first target position to the second target position at the target speed.

20 Claims, 5 Drawing Sheets

(51) Int. Cl.
  *B60W 10/30*  (2006.01)
  *B60W 10/20*  (2006.01)
  *A01D 57/20*  (2006.01)
  *A01B 69/04*  (2006.01)
  *A01D 75/02*  (2006.01)

(52) U.S. Cl.
  CPC ............ *B60W 10/04* (2013.01); *B60W 10/20* (2013.01); *B60W 10/30* (2013.01); *G05D 1/0223* (2013.01); *A01D 75/02* (2013.01); *B60W 2300/152* (2013.01); *B60W 2300/158* (2013.01); *B60W 2510/06* (2013.01); *B60W 2510/18* (2013.01); *B60W 2510/20* (2013.01); *B60W 2554/801* (2020.02); *B60W 2554/802* (2020.02); *B60W 2710/20* (2013.01); *B60W 2710/30* (2013.01); *B60W 2720/10* (2013.01); *B60W 2720/12* (2013.01); *B60W 2754/20* (2020.02); *B60W 2754/30* (2020.02); *B60W 2754/50* (2020.02); *G05D 2201/0201* (2013.01)

(58) Field of Classification Search
  CPC ...... A01B 69/008; A01D 57/20; A01D 75/02; A01D 41/1278; A01D 41/1217; B60W 10/04; B60W 10/20; B60W 10/30; B60W 2300/152; B60W 2300/158; B60W 2510/06; B60W 2510/18; B60W 2510/20; B60W 2554/801; B60W 2554/802; B60W 2710/20; B60W 2710/30; B60W 2720/10; B60W 2720/12; B60W 2754/20; B60W 2754/30; B60W 2754/50
  USPC .......................................................... 701/25
  See application file for complete search history.

(56) References Cited

U.S. PATENT DOCUMENTS

| | | |
|---|---|---|
| 8,814,640 B2 | 8/2014 | Behnke et al. |
| 8,868,304 B2 | 10/2014 | Bonefas |
| 9,002,591 B2 | 4/2015 | Wang et al. |
| 9,113,598 B2 | 8/2015 | Wood et al. |
| 9,415,953 B2 | 8/2016 | Bonefas |
| 9,462,748 B2 * | 10/2016 | Dollinger ............... A01D 90/10 |
| 9,642,305 B2 * | 5/2017 | Nykamp ............. A01D 41/1217 |
| 9,915,952 B2 * | 3/2018 | Dollinger ............... G05D 1/0276 |
| 10,966,369 B2 | 4/2021 | Suleman |
| 2014/0237981 A1 * | 8/2014 | Roberge ................. A01F 15/106 |
| | | 198/572 |
| 2015/0366134 A1 * | 12/2015 | Dollinger ............... A01D 90/10 |
| | | 701/50 |
| 2017/0192419 A1 * | 7/2017 | Ray ........................ A01D 43/07 |
| 2019/0377363 A1 * | 12/2019 | Shelton ................. G05D 1/0231 |
| 2020/0128738 A1 * | 4/2020 | Suleman ............. A01D 41/1278 |
| 2020/0128740 A1 * | 4/2020 | Suleman ................. A01D 57/06 |
| 2020/0128743 A1 * | 4/2020 | Pereira ................... A01D 61/02 |
| 2020/0133262 A1 | 4/2020 | Suleman et al. |

\* cited by examiner

SYSTEM FOR COORDINATING CONTROL OF MULTIPLE WORK VEHICLES

CROSS-REFERENCE TO RELATED APPLICATION

This application claims priority from and the benefit of U.S. Provisional Application Ser. No. 63/016,694, entitled "System for Coordinating Control of Multiple Work Vehicles," filed Apr. 28, 2020, which is hereby incorporated by reference in its entirety.

BACKGROUND

The present disclosure relates generally to a system for coordinating control of multiple work vehicles.

A harvester may be used to harvest agricultural crops, such as cotton, wheat, flax, or other crops. Generally, components (e.g., drums, spindles, blades, etc.) of the harvester remove portions of the agricultural crop from the ground. The harvester then conveys the removed portions of the agricultural crop (e.g., agricultural products) to an internal storage compartment, either directly or via a processing device configured to remove undesirable portions of the agricultural products.

As the harvester traverses a field, the volume of agricultural product stored within the internal storage compartment increases. Accordingly, the internal storage compartment is typically unloaded multiple times during the harvesting process. One method of unloading the internal storage compartment, generally known as unloading on-the-go, involves periodically transferring the agricultural product to a mobile storage compartment while the harvester is in motion. The mobile storage compartment is towed by a haul vehicle to a position proximate to the harvester to facilitate unloading. For example, certain haul vehicles include a control system configured to automatically direct the haul vehicle to a position that aligns the storage compartment with a conveyor outlet of the harvester. Once aligned, the agricultural product may be transferred from the harvester to the mobile storage compartment via the conveyor outlet, thereby unloading the internal storage compartment of the harvester. However, certain control systems control the haul vehicle such that the agricultural product is transferred to a single unloading point within the storage compartment. As a result, the agricultural product may be unevenly distributed within the storage compartment. Other control systems may enable an operator to manually adjust the position of the conveyor outlet relative to the storage compartment during the unloading process. Unfortunately, the operator may not be able to effectively control the position of the conveyor outlet due to performance of other higher priority tasks associated with operation of the harvester and/or haul vehicle. As a result, the agricultural product may not be evenly distribution within the storage compartment.

BRIEF DESCRIPTION

In certain embodiments, a control system includes a controller having a memory and a processor. The controller is configured to determine a target speed between a first target position of a haul vehicle relative to a harvester and a second target position of the haul vehicle relative to the harvester based at least in part on a flow rate of agricultural product through a conveyor of the harvester. The haul vehicle is coupled to a storage compartment and configured to move the storage compartment through a field, an outlet of the conveyor is aligned with a first unloading point within the storage compartment while the haul vehicle is positioned at the first target position, and the outlet of the conveyor is aligned with a second unloading point within the storage compartment while the haul vehicle is positioned at the second target position. Furthermore, the controller is configured to output a control signal indicative of instructions to direct the haul vehicle from the first target position to the second target position at the target speed.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
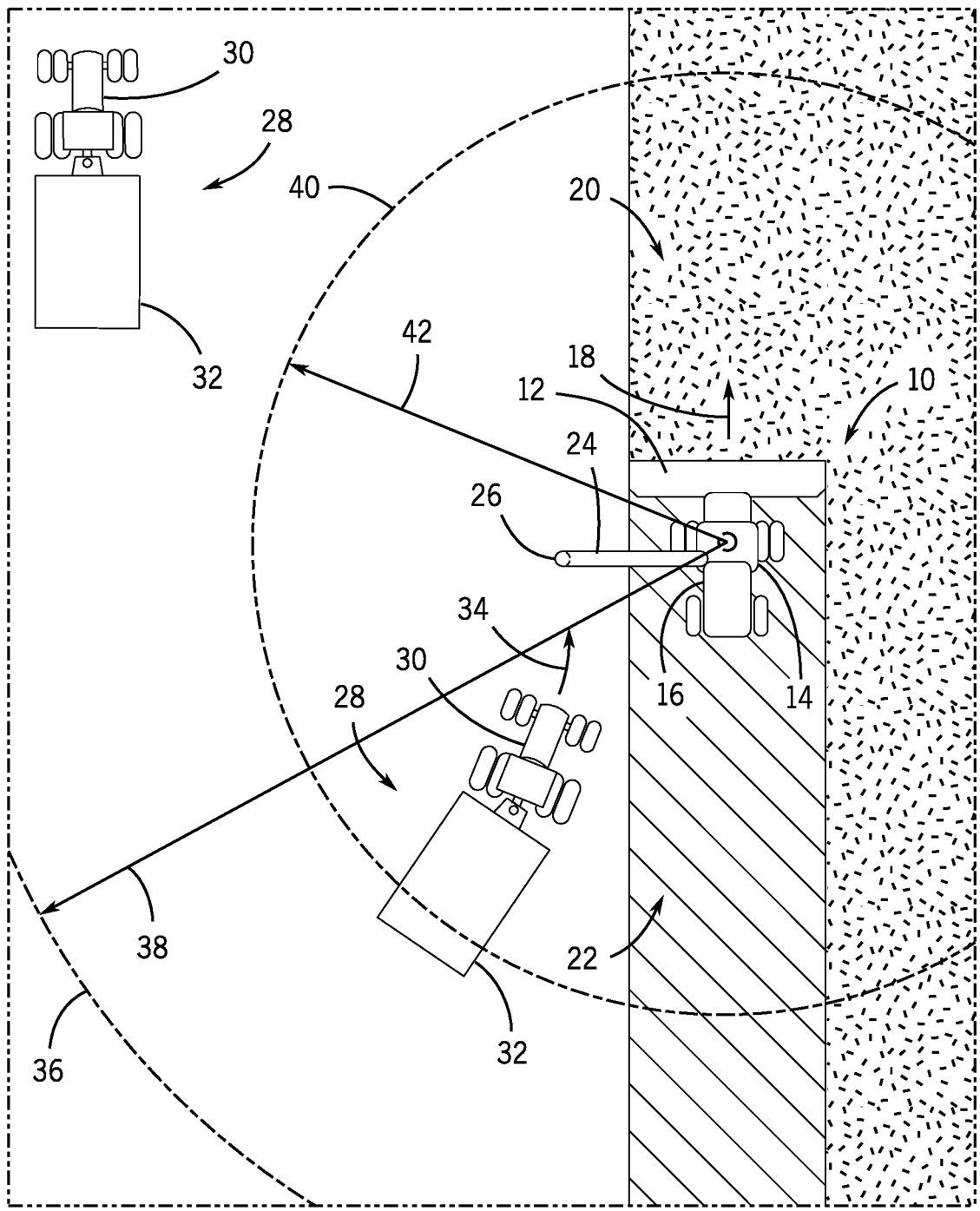
FIG. 1 is a top view of an embodiment of an agricultural harvester and an agricultural product transportation system, in which the agricultural product transportation system is configured to automatically dock with the agricultural harvester.

FIG. 1 is a top view of an embodiment of an agricultural harvester and an agricultural product transportation system, in which the agricultural product transportation system is configured to automatically dock with the agricultural harvester. In the illustrated embodiment, the agricultural harvester 10 includes a row of harvesting units 12 (e.g., header)

positioned on a front end of a chassis 14 and an internal storage compartment 16 coupled to the chassis 14. As the agricultural harvester 10 traverses a field along a direction of travel 18, the harvesting units 12 engage unharvested plants 20 and extract various agricultural products (e.g., corn, wheat, cotton, etc.) from the plants. These agricultural products are transferred to the internal storage compartment 16, either directly or via a processing device configured to remove undesirable portions of the agricultural products. The remaining portions of the plants remain in the field as agricultural residue 22.

As the harvester 10 traverses the field, the volume of agricultural product stored within the internal storage compartment 16 increases. Accordingly, the harvester 10 includes a conveyor 24 configured to transfer the agricultural product to a mobile storage compartment while the harvester is in motion. The conveyor 24 may include an auger, a conveyor belt, or another suitable device configured to transfer the agricultural product from the internal storage compartment 16 to an outlet 26. As discussed in detail below, the mobile storage compartment may be automatically aligned with the conveyor outlet 26, thereby enhancing the efficiency of the harvester unloading process. While the illustrated agricultural harvester 10 is a self-propelled vehicle, in certain embodiments, the agricultural harvester may be towed behind a tractor or other work vehicle. In addition, while the illustrated agricultural harvester 10 includes an internal storage compartment 16, the internal storage compartment may be omitted in certain harvester configurations. In such configurations, the harvester may continuously transfer agricultural product to the mobile storage compartment as the harvester extracts and processes the agricultural products.

In the illustrated embodiment, an agricultural product transportation system 28 is configured to receive the agricultural product from the harvester 10. As illustrated, the agricultural product transportation system 28 includes a haul vehicle 30, such as the illustrated tractor, and a mobile storage compartment 32 (e.g., grain cart). The haul vehicle 30 includes a controller configured to automatically direct the haul vehicle along a route 34 to a target position proximate to the harvester 10. For example, the controller may automatically control the haul vehicle 30 during a docking process, thereby positioning the storage compartment in a location that enhances the transfer efficiency of the agricultural product from the harvester to the storage compartment. In certain embodiments, the controller is configured to determine a target position and a target velocity of the haul vehicle based at least in part on a determined position and a determined velocity of the harvester 10. The controller is also configured to control a steering control system and a speed control system to direct the haul vehicle toward the target position. Once the haul vehicle substantially reaches the target position, the controller is configured to control the steering control system and the speed control system to substantially maintain the target position and the target velocity. While the storage compartment 32 is towed by the haul vehicle 30 in the illustrated embodiment, in other embodiments, the storage compartment may be rigidly coupled to the haul vehicle (e.g., such that the storage compartment forms a portion of the haul vehicle).

In certain embodiments, the target position corresponds to a position that substantially aligns the conveyor outlet 26 with an unloading point within the storage compartment 32. Accordingly, with the haul vehicle located at the target position, the agricultural product may be transferred from the harvester 10 to the storage compartment 32 while the vehicles are in motion. Because the controller automatically maintains the position of the storage compartment relative to the conveyor outlet during the unloading process, the possibility of agricultural product loss is substantially reduced or eliminated, thereby increasing the efficiency of the harvesting process.

By way of example, when the haul vehicle 30 enters an area of communication 36, communication is automatically established between a first transceiver on the haul vehicle 30 and a second transceiver on the harvester 10. The controller of the haul vehicle detects the harvester upon receiving a signal from the harvester transceiver, and the controller of the harvester detects the haul vehicle upon receiving a signal from the haul vehicle transceiver. A range 38 of the area of communication 36 may be dependent on the broadcast power of the transceivers, the sensitivity of the transceivers, the communication frequency, another suitable factor, or a combination thereof. In certain embodiments, each transceiver is configured to transmit data at a fixed interval (e.g., 50 Hz, 20 Hz, 10 Hz, 5 Hz, 1 Hz, 0.5 Hz, 0.1 Hz, etc.). The data may include a position of the haul vehicle/harvester, a velocity of the haul vehicle/harvester, a steering angle of the haul vehicle/harvester, an orientation of the haul vehicle/harvester, an identity of the haul vehicle/harvester, other parameter(s), or a combination thereof. In addition, each transceiver may be configured to retransmit data received from another transceiver. For example, the haul vehicle closer to the harvester may receive a signal from the harvester, and then retransmit the signal to the haul vehicle farther from the harvester, thereby effectively extending the communication range of each transceiver.

To initiate the docking process, an operator of the haul vehicle provides input to a user interface, thereby instructing the controller to enable automatic control of the haul vehicle. If the haul vehicle is within an area of engagement 40 (e.g., a distance between the harvester and the haul vehicle is less than an engagement distance 42), the controller controls the steering control system and the speed control system to direct the haul vehicle toward the target position. For example, if the harvester is positioned in front of the haul vehicle, the speed control system may increase the speed of the haul vehicle. Conversely, if the harvester is positioned behind the haul vehicle, the speed control system may slow or stop the haul vehicle until the harvester reaches a docking position. In addition, the steering control system may adjust wheel angles, for example, to steer the haul vehicle toward the harvester. Once the haul vehicle substantially reaches the target position, the controller controls the steering control system and the speed control system to substantially maintain the target position and the target velocity, thereby facilitating transfer of agricultural product from the harvester to the storage compartment.

In certain embodiments, a control system of the harvester is configured to calibrate alignment of the conveyor outlet of the harvester with the storage compartment of the agricultural product transportation system (e.g., prior to initiation of the harvesting/unloading process). In such embodiments, a controller of the control system is configured to receive a first signal from a user interface indicative of alignment of the conveyor outlet with a first point on the storage compartment, and to determine a first position of the storage compartment relative to the harvester upon receiving the first signal. The controller is also configured to receive a second signal from the user interface indicative of alignment of the conveyor outlet with a second point on the storage compartment, diagonally opposite the first point, and to determine a second position of the storage compartment relative to the harvester upon receiving the second signal. In addition, the controller is configured to establish a bounding rectangle having a first corner at the first point and a second corner at the second point based on the first position and the second position.

As discussed in detail below, the controller is configured to establish unloading points within the storage compartment, and the controller is configured to enable product flow from the conveyor outlet to the storage compartment while the conveyor outlet in positioned at the unloading points and while the conveyor outlet is moving between the unloading points. In certain embodiments, the controller may position each unloading point within the bounding rectangle. Furthermore, in certain embodiments, the controller is configured to automatically engage and terminate product flow from the conveyor outlet to the storage compartment based on a position of the conveyor outlet. For example, the controller may engage product flow from the conveyor outlet to the storage compartment while the position of the conveyor outlet is within the bounding rectangle, and the controller may terminate product flow from the conveyor outlet to the storage compartment while the position of the conveyor outlet is outside of the bounding rectangle. Automatically controlling engagement and termination of the product flow may enable an operator of the work vehicle to focus on other tasks associated with agricultural operations. In addition, the quantity of product delivered to an undesirable area (e.g., the surface of the field) may be substantially reduced.

In certain embodiments, the controller is configured to determine a target speed between a first target position of the haul vehicle relative to the harvester and a second target position of the haul vehicle relative to the harvester based at least in part on a flow rate of the agricultural product through the conveyor. The outlet of the conveyor is aligned with a first unloading point within the storage compartment (e.g., within the bounding rectangle) while the haul vehicle is positioned at the first target position, and the outlet of the conveyor is aligned with a second unloading point within the storage compartment (e.g., within the bounding rectangle) while the haul vehicle is positioned at the second target position. The controller is also configured to output a control signal indicative of instructions to direct the haul vehicle form the first target position to the second target position at the target speed. The target speed may be selected to establish a substantially even distribution of the agricultural product (e.g., at a target level) along a path between the first unloading point and the second unloading point. As a result, the distribution of the agricultural product within the storage compartment may be controlled more precisely than by moving the conveyor outlet between the unloading points at a preset speed.

Furthermore, in certain embodiments, the controller is configured to determine an expected duration of traversing a distance between a first target position of the haul vehicle relative to the harvester and a second target position of the haul vehicle relative to the harvester. The outlet of the conveyor is aligned with a first unloading point within the storage compartment (e.g., within the bounding rectangle) while the haul vehicle is positioned at the first target position, and the outlet of the conveyor is aligned with a second unloading point within the storage compartment (e.g., within the bounding rectangle) while the haul vehicle is positioned at the second target position. In addition, the controller is configured to determine a target time for reaching the second target position based at least in part on the flow rate of the agricultural product through the conveyor. The controller is also configured to output a control signal indicative of instructions to direct the haul vehicle from the first target position to the second target position at an initiation time, in which the initiation time corresponds to the target time minus the expected duration. Accordingly, the haul vehicle may arrive at the second target position substantially at the target time. As a result, the agricultural product may be substantially evenly distributed throughout the storage compartment (e.g., as compared to a system in which the haul vehicle is instructed to move between target positions without consideration of the expected duration of the move).

Figure 2:
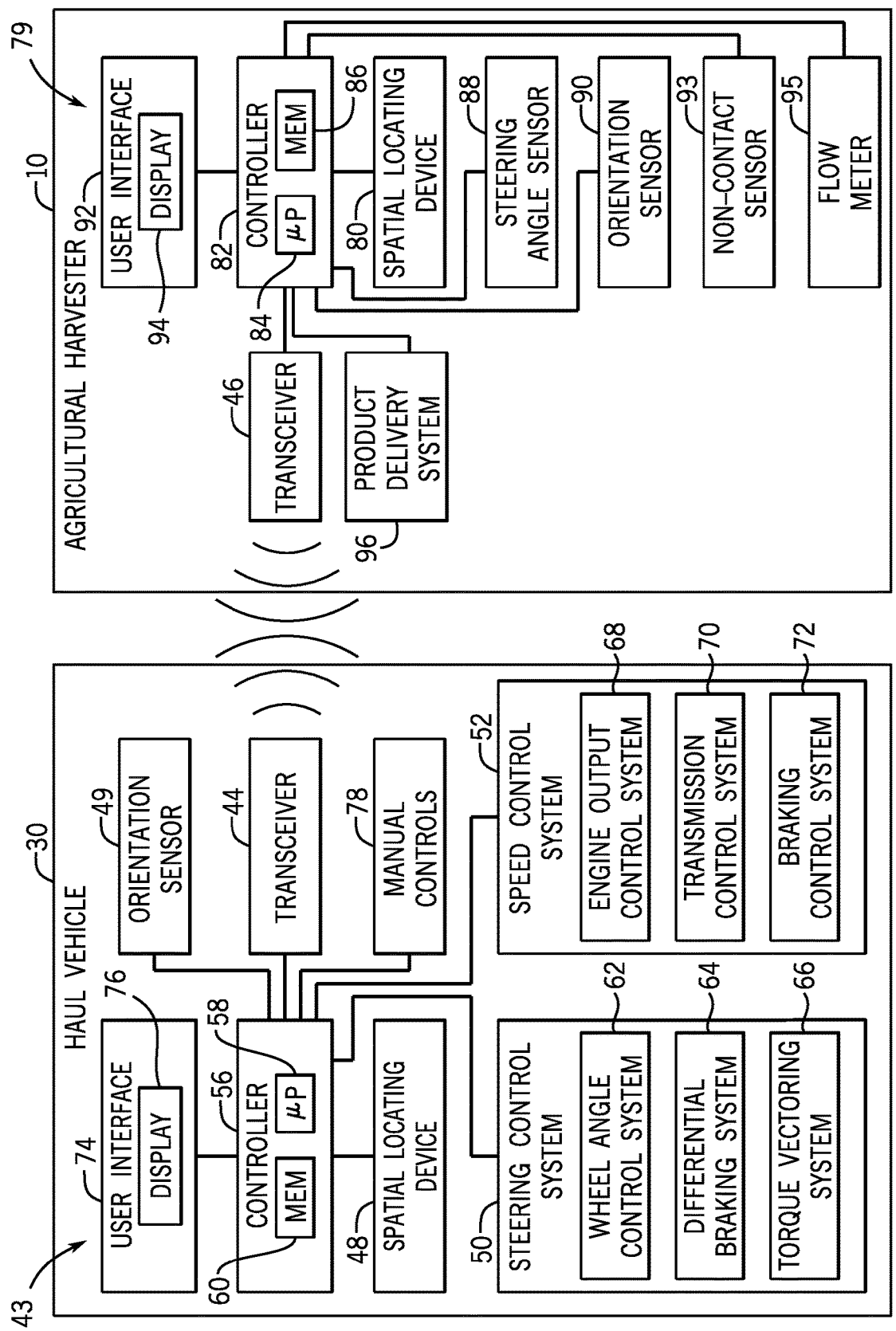
FIG. 2 is a schematic diagram of an embodiment of an agricultural harvester and a haul vehicle, which may be employed within the agricultural product transportation system of FIG. 1.

FIG. 2 is a schematic diagram of an embodiment of an agricultural harvester 10 and a haul vehicle 30, which may be employed within the agricultural product transportation system of FIG. 1. In the illustrated embodiment, the haul vehicle 30 includes a control system 43 having a first transceiver 44 configured to receive a first signal from a second transceiver 46 of the agricultural harvester 10. The first signal is indicative of a first determined position (e.g., three-dimensional position vector) and, in certain embodiments, a first determined velocity (e.g., three-dimensional velocity vector) of the harvester 10. The first and second transceivers may operate at any suitable frequency range within the electromagnetic spectrum. For example, in certain embodiments, the transceivers may broadcast and receive radio waves within a frequency range of about 1 GHz to about 10 GHz. In addition, the first and second transceivers may utilize any suitable communication protocol, such as a standard protocol (e.g., Wi-Fi, Bluetooth, cellular, etc.) or a proprietary protocol.

As used herein, "position" (e.g., determined position, target position, etc.) refers to a position vector, such as a one, two, or three-dimensional position vector. For example, a two-dimensional position vector may include latitude and longitude, and a three-dimensional position vector may include latitude, longitude, and altitude/elevation (e.g., above a ground plane). The position vector may be represented in a rectangular, polar, cylindrical, or spherical coordinate system, among other suitable coordinate systems. In addition, as used herein, "velocity" (e.g., determined velocity, target velocity, etc.) refers to a velocity vector, such as a one, two, or three-dimensional velocity vector. For example, a one-dimensional velocity vector may include speed (e.g., ground speed), a two-dimensional velocity vector may include speed (e.g., ground speed) and heading within a plane (e.g., along a ground plane), and a three-dimensional velocity vector may include speed and heading within a three-dimensional space. The velocity vector may be represented in a rectangular, polar, cylindrical, or spherical coordinate system, among other suitable coordinate systems. In certain embodiments, the velocity may be represented as a unit/normalized vector, i.e., a vector having a unit magnitude. In such embodiments, the magnitude (e.g., speed) is not included in the velocity vector. For example, a two-dimensional velocity unit vector may be representative of heading within a plane (e.g., along a ground plane), and a three-dimensional velocity unit vector may be representative of heading within a three-dimensional space.

The haul vehicle control system 43 also includes a spatial locating device 48, which is mounted to the haul vehicle 30 and configured to output a signal indicative of a second determined position and, in certain embodiments, a second determined velocity of the haul vehicle 30. The spatial locating device may include any suitable system configured to measure the position and, in certain embodiments, velocity of the haul vehicle, such as a global positioning system (GPS), for example. In certain embodiments, the spatial locating device 48 may be configured to measure the position and, in certain embodiments, velocity of the haul vehicle relative to a fixed point within a field (e.g., via a fixed radio transceiver). Accordingly, the spatial locating device 48 may be configured to measure the position and, in certain embodiments, velocity of the haul vehicle relative to a fixed global coordinate system (e.g., via the GPS) or a fixed local coordinate system. Furthermore, in certain embodiments, the spatial locating device 48 may be configured to measure the position and, in certain embodiments, velocity of the haul vehicle relative to the harvester (e.g., to establish a moving local coordinate system). In certain embodiments, the first transceiver 44 is configured to broadcast a second signal indicative of the second determined position and, in certain embodiments, the second determined velocity to other vehicles within the area of communication. The second signal from each haul vehicle may be utilized to determine which vehicle is closest to the harvester, thereby enabling the closest haul vehicle to dock with the harvester while the remaining vehicles wait for a subsequently unloading cycle.

In addition, the haul vehicle control system 43 includes an orientation sensor 49 configured to output a signal indicative of a pitch angle, a yaw angle, a roll angle, or a combination thereof, of the haul vehicle. For example, the orientation senor 49 may include a gyroscope or other sensor configured to monitor the orientation of the haul vehicle 30. In certain embodiments, the orientation sensor 49 is also configured to output a signal indicative of a pitch rate, a yaw rate, a roll rate, or a combination thereof. Furthermore, in certain embodiments, the haul vehicle control system 43 is configured to compare the orientation (e.g., pitch angle, yaw angle, roll angle) of the haul vehicle 30 to a measured orientation (e.g., pitch angle, yaw angle, roll angle) of the harvester 10 to establish a relative orientation that may be utilized to enhance the accuracy of the docking process.

In the illustrated embodiment, the control system 43 includes a steering control system 50 configured to control a direction of movement of the haul vehicle 30, and a speed control system 52 configured to control a speed of the haul vehicle 30. In addition, the control system 43 includes a controller 56 communicatively coupled to the first transceiver 44, to the spatial locating device 48, to the steering control system 50, and to the speed control system 52. The controller 56 is configured to automatically control the haul vehicle 30 during docking and while docked with the harvester, thereby enhancing transfer efficiency of the agricultural product to the storage compartment. In certain embodiments, the controller 56 is configured to determine a target position for the haul vehicle relative to the harvester to facilitate the transfer of agricultural product. The controller 56 is also configured to determine a route to the target position based at least in part on the current position of the haul vehicle relative to the harvester (e.g., which may be determined based on the first determined position of the harvester and the second determined position of the haul vehicle). Once the route is determined, the controller is configured to control the steering control system and the speed control system to direct the haul vehicle toward the target position along the route. Upon substantially reaching the target position, the controller is configured to control the steering control system and the speed control system to substantially maintain the target position.

The haul vehicle control system may utilize the determined velocity of the harvester to determine an expected position of the harvester at the time of docking. Accordingly, the route to the target position may be determined based on the expected harvester position instead of the instantaneous harvester position. As a result, the efficiency of the docking process may be enhanced, thereby reducing the duration and costs associated with harvesting operations. The steering angle of the harvester, orientation of the harvester, heading of the harvester, acceleration of the harvester, or a combination thereof, may also be utilized to determine the route to the target position, thereby further enhancing the efficiency of the docking process.

In certain embodiments, the target position is laterally and/or longitudinally offset from the harvester. For example, an unloading point may be established within the storage compartment (e.g., within the bounding rectangle). In such embodiments, the haul vehicle controller 56 may determine a target position that substantially aligns the unloading point with the conveyor outlet of the harvester, thereby facilitating efficient transfer of agricultural product from the harvester to the storage compartment. The target position (e.g., first target position) may be determined before or during the docking process between the haul vehicle and the harvester.

In certain embodiments, the controller 56 is also configured to determine a distance between the haul vehicle and the harvester based on the current position of the haul vehicle relative to the harvester (e.g., which may be determined based on the first determined position of the harvester and the second determined position of the haul vehicle). If the distance is less than or equal to the engagement distance, the controller 56 is configured to enable automatic control of the haul vehicle. Otherwise, the automatic control is disabled. In certain embodiments, upon detection of a separation distance less than or equal to the engagement distance, the controller 56 is configured to instruct a user interface to present an indication to an operator that automatic control is enabled. The operator may then initiate automatic control (e.g., via the user interface), thereby instructing the controller to direct the haul vehicle toward the target position.

In certain embodiments, the controller 56 is an electronic controller having electrical circuitry configured to process data from the transceiver 44, the spatial locating device 48, other components of the control system 43, or a combination thereof. In the illustrated embodiment, the controller 56 include a processor, such as the illustrated microprocessor 58, and a memory device 60. The controller 56 may also include one or more storage devices and/or other suitable components. The processor 58 may be used to execute software, such as software for controlling the haul vehicle 30, and so forth. Moreover, the processor 58 may include multiple microprocessors, one or more "general-purpose" microprocessors, one or more special-purpose microprocessors, and/or one or more application specific integrated circuits (ASICS), or some combination thereof. For example, the processor 58 may include one or more reduced instruction set (RISC) processors.

The memory device 60 may include a volatile memory, such as random access memory (RAM), and/or a nonvolatile memory, such as read-only memory (ROM). The memory device 60 may store a variety of information and may be used for various purposes. For example, the memory device 60 may store processor-executable instructions (e.g., firmware or software) for the processor 58 to execute, such as instructions for controlling the haul vehicle 30. The storage device(s) (e.g., nonvolatile storage) may include ROM, flash memory, a hard drive, or any other suitable optical, magnetic, or solid-state storage medium, or a combination thereof. The storage device(s) may store data (e.g., position data, identification data, etc.), instructions (e.g., software or firmware for controlling the haul vehicle, etc.), and any other suitable data.

In the illustrated embodiment, the steering control system 50 includes a wheel angle control system 62, a differential braking system 64, and a torque vectoring system 66. The wheel angle control system 62 may automatically rotate one or more wheels and/or tracks of the haul vehicle (e.g., via hydraulic actuators) to steer the haul vehicle along a target route. By way of example, the wheel angle control system 62 may rotate front wheels/tracks, rear wheels/tracks, intermediate wheels/tracks, or a combination thereof, of the haul vehicle (e.g., either individually or in groups). The differential braking system 64 may independently vary the braking force on each lateral side of the haul vehicle to direct the haul vehicle along a target route. In addition, the torque vectoring system 66 may differentially apply torque from an engine to wheel(s) and/or track(s) on each lateral side of the haul vehicle, thereby directing the haul vehicle along a target route. While the illustrated steering control system 50 includes the wheel angle control system 62, the differential braking system 64, and the torque vectoring system 66, alternative embodiments may include one or two of these systems, in any suitable combination. In further embodiments, the steering control system may include other and/or additional systems (e.g., an articulating steering system in which a front portion of the haul vehicle articulates relative to a rear portion of the haul vehicle, etc.) to facilitate directing the haul vehicle along a target route.

In the illustrated embodiment, the speed control system 52 includes an engine output control system 68, a transmission control system 70, and a braking control system 72. The engine output control system 68 is configured to vary the output of the engine to control the speed of the haul vehicle. For example, the engine output control system 68 may vary a throttle setting of the engine, a fuel/air mixture of the engine, a timing of the engine, other suitable engine parameters, or a combination thereof, to control engine output. In addition, the transmission control system 70 may adjust a gear ratio within a transmission (e.g., by adjusting gear selection in a transmission with discrete gears, by controlling a continuously variable transmission (CVT), etc.) to control the speed of the haul vehicle. Furthermore, the braking control system 72 may adjust braking force, thereby controlling the speed of the haul vehicle 30. While the illustrated speed control system 52 includes the engine output control system 68, the transmission control system 70, and the braking control system 72, alternative embodiments may include one or two of these systems, in any suitable combination. In further embodiments, the speed control system may include other and/or additional systems (e.g., an electric motor controller for an electric motor, etc.) to facilitate adjusting the speed of the haul vehicle.

In the illustrated embodiment, the haul vehicle control system 43 includes a user interface 74 communicatively coupled to the controller 56. The user interface 74 is configured to selectively instruct the controller 56 to automatically control the haul vehicle based on operator input. For example, the operator may position the haul vehicle within the area of engagement, and then activate the automatic docking process via input to the user interface 74. In certain embodiments, the user interface includes a display 76 configured to present information to the operator, such as whether the haul vehicle is within the area of communication, whether the haul vehicle is within the area of engagement, and whether conditions for automatic docking have been satisfied, among other parameters.

As illustrated, the haul vehicle 30 includes manual controls 78 configured to enable an operator to control the haul vehicle while the automatic control system is disengaged. The manual controls 78 may include manual steering control, manual transmission control, manual braking control, other suitable controls, or a combination thereof. In the illustrated embodiment, the manual controls 78 are communicatively coupled to the controller 56. The controller 56 is configured to disengage automatic control of the haul vehicle upon receiving a signal indicative of manual control of the haul vehicle. Accordingly, if an operator controls the haul vehicle manually, the automatic docking/docked process terminates, thereby restoring control of the haul vehicle to the operator.

In the illustrated embodiment, the harvester 10 includes a control system 79 having a spatial locating device 80, which is mounted to the harvester 10 and configured to output a signal indicative of the first determined position and, in certain embodiments, the first determined velocity of the agricultural harvester 10. The harvester spatial locating device 80 may include any suitable system configured to measure the position, and in certain embodiments, velocity of the harvester, such as a global positioning system (GPS), for example. In certain embodiments, the spatial locating device 80 may be configured to measure the position and, in certain embodiments, velocity of the harvester relative to a fixed point within a field (e.g., via a fixed radio transceiver). Accordingly, the spatial locating device 80 may be configured to measure the position and, in certain embodiments, velocity of the harvester relative to a fixed global coordinate system (e.g., via the GPS) or a fixed local coordinate system. As illustrated, the spatial locating device 80 is communicatively coupled to a controller 82 of the harvester control system 79. The harvester controller 82 includes a processor, such as the illustrated microprocessor 84, and a memory device 86. The controller 82 is communicatively coupled to the second transceiver 46 and configured to output position and, in certain embodiments, velocity information from the spatial locating device 80 to the transceiver 46, thereby generating the first signal indicative of the first determined position and, in certain embodiments, the first determined velocity of the agricultural harvester 10.

In the illustrated embodiment, the harvester control system 79 also includes a steering angle sensor 88 and an orientation sensor 90. The steering angle sensor 88 is configured to output a signal indicative of a measured and/or determined steering angle. For example, the steering angle sensor 88 may be configured to measure an angle of certain wheels/tracks (e.g., front wheels/tracks, rear wheels/tracks, etc.) relative to the chassis of the harvester. The steering angle sensor 88 may also be configured to measure differential braking forces (e.g., the braking force applied to each lateral side of the harvester). In addition, the steering angle sensor 88 may be configured to measure torque applied to each lateral side of the harvester (e.g., torque applied to a left wheel/track and torque applied to a right wheel/track). As illustrated, the steering angle sensor 88 is communicatively coupled to the controller 82. The controller 82 is configured to receive the signal indicative of steering angle from the sensor 88, and to output the signal to the transceiver 46. The transceiver 46, in turn, is configured to incorporate the steering angle information into the first signal to the haul vehicle. The steering angle information may enable the haul vehicle control system to more accurately predict the expected position of the harvester, thereby enhancing the efficiency of the docking process. The steering angle information may also enable the haul vehicle control system to more accurately position the haul vehicle at the target position while the haul vehicle is docked with the harvester.

Furthermore, the orientation sensor 90 is configured to output a signal indicative of a measured pitch angle, a measured yaw angle, a measured roll angle, or a combination thereof, of the harvester. For example, the orientation senor 90 may include a gyroscope or other sensor configured to monitor the orientation of the harvester 10. In certain embodiments, the orientation sensor 90 is also configured to output a signal indicative of a pitch rate, a yaw rate, a roll rate, or a combination thereof. As illustrated, the orientation sensor 90 is communicatively coupled to the controller 82. The controller 82 is configured to receive the signal indicative of the orientation measurements from the orientation sensor 90, and to output the signal to the transceiver 46. The transceiver 46, in turn, is configured to incorporate the orientation information into the first signal to the haul vehicle. The orientation information may enable the haul vehicle control system to more accurately predict the expected position of the harvester, thereby enhancing the efficiency of the docking process. The orientation information may also enable the haul vehicle control system to more accurately position the haul vehicle at the target position while the haul vehicle is docked with the harvester.

While the illustrated harvester control system includes a steering angle sensor 88 and an orientation sensor 90, one or both of these sensors may be omitted in certain embodiments. In addition, the harvester control system may include additional sensors configured to measure other parameters associated with operation of the harvester. For example, in certain embodiments, the harvester control system may include an electronic compass configured to output a signal indicative of heading. In further embodiments, the harvester control system may include an accelerometer configured to output a signal indicative of acceleration (e.g., three-dimensional acceleration) of the harvester. The output from such sensors may be incorporated within the first signal to the haul vehicle. For example, in certain embodiments, the heading information may be incorporated within the first determined velocity. The heading and/or acceleration information may enable the haul vehicle control system to more accurately predict the expected position of the harvester, thereby enhancing the efficiency of the docking process. The heading and/or acceleration information may also enable the haul vehicle control system to more accurately position the haul vehicle at the target position while the haul vehicle is docked with the harvester. While an electronic compass and an accelerometer are described above, in further embodiments the harvester control system may include other and/or additional suitable sensors.

In the illustrated embodiment, the harvester control system 79 includes a user interface 92 configured to receive input from an operator of the agricultural harvester. The user interface 92 includes a display 94 configured to present information to the harvester operator and/or to receive input from the operator. As illustrated, the user interface 92 is communicatively coupled to the controller 82.

In the illustrated embodiment, the harvester control system 79 includes a non-contact sensor 93 communicatively coupled to the controller 82. In certain embodiments, the non-contact sensor 93 (e.g., including a camera, infrared sensor, light detection and ranging (LIDAR) sensor, radio detection and ranging (RADAR) sensor, ultrasonic sensor, etc.) is coupled to the conveyor (e.g., at the outlet) and configured to be directed toward the storage compartment. In certain embodiments (e.g., embodiments in which the non-contact sensor includes a camera or infrared sensor), the non-contact sensor 93 is configured to output a signal to the controller 82 indicative of an image or series of images of the storage compartment. The controller 82, in turn, is configured to output a corresponding signal to the user interface 92, which directs the display 94 to present one or more visual images of the storage compartment to the operator. The non-contact sensor 93 may be communicatively coupled directly to the user interface 92 in alternative embodiments. The visual image(s) presented by the display 94 may assist the operator in identifying alignment of the conveyor outlet with the first and second points on the storage compartment. As a result, the accuracy of the alignment calibration process may be enhanced.

In certain embodiments (e.g., embodiments in which the non-contact sensor includes a LIDAR sensor, a RADAR sensor, or an ultrasonic sensor), the controller 82 may be configured to generate one or more images based on the signal output by the non-contact sensor. For example, the controller 82 may be configured to establish a three-dimensional model of a portion of the storage compartment based on the signal, and to output a signal to the user interface 92 indicative of one or more views (e.g., top view, perspective view, etc.) of the three-dimensional model. The display 94 of the user interface 92, in turn, may present the views to the operator, thereby assisting the operator in indentifying alignment of the conveyor outlet with the first and second points on the storage compartment.

Furthermore, in certain embodiments, the controller 82 may determine a level and/or a profile of the agricultural product within the storage compartment based on feedback from the non-contact sensor. Additional or alternatively, the controller 82 may determine a flow rate of the agricultural product from the conveyor to the storage compartment based on the feedback from the non-contact sensor. For example, the controller 82 may determine a level of the agricultural product within the storage compartment at a first time, determine a level of the agricultural product within the storage compartment at a second time, and determine the flow rate based on the change in level and the time difference. While the non-contact sensor 93 is coupled to the conveyor (e.g., the outlet of the conveyor) in the illustrated embodiment, in other embodiments, the non-contact sensor 93 may be mounted to the storage compartment, to the haul vehicle, or to another suitable portion of the harvester. In embodiments in which the non-contact sensor is mounted to the haul vehicle or the storage compartment, the non-contact sensor may be communicatively coupled to the harvester controller via the transceivers and the haul vehicle controller.

In the illustrated embodiment, the harvester control system 79 includes a flow meter 95 communicatively coupled to the controller 82. The flow meter 95 is configured to output a signal indicative of a flow rate of the agricultural product through the conveyor. The flow meter 95 may include any suitable type of sensor configured to monitor the flow rate of the agricultural product, such as an optical sensor or a capacitive sensor. For example, in certain embodiments, the flow meter may include a wheel positioned within the flow path of the agricultural product through the conveyor and a counter configured to output a signal indicative of the number of rotations of the wheel/speed of the wheel. Furthermore, in certain embodiments, the flow meter may include a sensor configured to monitor a speed of an auger or a belt of the conveyor. While the harvester control system 79 includes the non-contact sensor 93 and the flow meter 95 in the illustrated embodiment, in other embodiments, the non-contact sensor and/or the flow meter may be omitted.

In the illustrated embodiment, the agricultural harvester 10 includes a product deliver system 96 (e.g., including a belt or an auger of the conveyor) configured to transfer agricultural product from the harvester to the storage compartment. As illustrated, the product deliver system 96 is communicatively coupled to the controller 82. In certain embodiments, the controller 82 is configured to engage product flow from the conveyor outlet to the storage compartment (e.g., via activation of the product deliver system 96) while (e.g., only while) the conveyor outlet is within a bounding shape (e.g., the bounding rectangle) within the storage compartment. In addition, the controller 82 may terminate product flow from the conveyor outlet to the storage compartment (e.g., via deactivation of the product delivery system 96) while the position of the conveyor outlet is outside of the bounding shape. While a bounding rectangle is disclosed herein, the bounding shape may be any other suitable shape (e.g., substantially corresponding to the shape, such as the inlet shape, of the storage compartment).

In certain embodiments, the operator of the agricultural harvester may override the automatic control of the product flow. For example, the user interface 92 may include/present a product flow engagement input (e.g., button, switch, etc.) and a product flow termination input (e.g., button, switch, etc.). Engaging the product flow engagement input (e.g., depressing a product flow engagement button) causes the user interface 92 to output a signal to the controller 82 indicative of product flow engagement. The controller 82, in turn, may engage product flow from the conveyor outlet to the storage compartment in response to receiving the signal, even though the position of the conveyor outlet is outside of the bounding shape. In addition, engaging the product flow termination input (e.g., depressing a product flow termination button) causes the user interface 92 to output a signal to the controller 82 indicative of product flow termination. The controller 82, in turn, may terminate product flow from the conveyor outlet to the storage compartment in response to the receiving the signal, even though the position of the conveyor outlet is within bounding shape.

Furthermore, in certain embodiments, the controller 82 is configured to output a signal to the user interface 92 indicative of conveyor outlet misalignment in response to the position of the conveyor outlet moving outside the bounding shape. For example, the user interface 92 may present a visual (e.g., via the display 94) and/or an audible notification that the conveyor outlet has moved outside of the bounding shape, thereby informing the operator of the misalignment. Upon receiving such a notification, the operator may manually correct the misalignment.

In certain embodiments, the controller 82 is configured to instruct the haul vehicle to move between multiple target positions while product is flowing from the conveyor outlet to the storage compartment, thereby moving the conveyor outlet between multiple unloading points. As a result, the distribution of the agricultural product within the storage compartment may be enhanced (e.g., a more even distribution of the agricultural product within the storage compartment may be established). For example, in certain embodiments, the controller 82 may output a control signal indicative of instructions to direct the haul vehicle 30 from a first target position relative to the harvester 10 to a second target position relative to the harvester 10. The outlet of the conveyor is aligned with a first unloading point within the storage compartment while the haul vehicle is positioned at the first target position, and the outlet of the conveyor is aligned with a second unloading point within the storage compartment while the haul vehicle is positioned at the second target position. The first and second unloading points may be offset laterally and/or longitudinally relative to one another. In certain embodiments, the control signal indicative of the instructions to direct the haul vehicle from the first target position to the second target position may include instructions to move the haul vehicle between the target positions at a target speed, thereby distributing the agricultural product substantially evenly along a path between the first unloading point and the second unloading point. The controller 82 may determine the target speed based on a flow rate of the agricultural product through the conveyor (e.g., as determined by the controller 82 based on feedback from the flow meter 95 and/or the non-contact sensor 93). For example, the controller 82 may determine a higher target speed for a higher flow rate, and the controller 82 may determine a lower target speed for a lower flow rate. Accordingly, the agricultural product 82 may be substantially evenly distributed (e.g., at a target level) along the path between the unloading points.

Furthermore, in certain embodiments, the controller 82 is configured to determine an expected duration of traversing the distance between the first target position of the haul vehicle relative to the harvester and the second target position of the haul vehicle relative to the harvester. The expected duration may be based on at least one performance characteristic of the haul vehicle, such as a maximum engine output of the engine of the haul vehicle, a maximum braking force of a braking system of the haul vehicle, a minimum turning radius of the haul vehicle, another suitable parameter, or a combination thereof. In addition, the controller 82 is configured to determine a target time for reaching the second target position based at least in part on the flow rate of the agricultural product through the conveyor. Furthermore, the controller 82 is configured to output a control signal indictive of instructions to direct the haul vehicle from the first target position to the second target position at an initiation time, in which the initiation time corresponds to the target time minus the expected duration. Accordingly, the haul vehicle may arrive at the second target position substantially at the target time. As a result, the agricultural product may be substantially evenly distributed throughout the storage compartment (e.g., as compared to a system in which the haul vehicle is instructed to move between target positions without consideration of the expected duration of the move).

Figure 3:
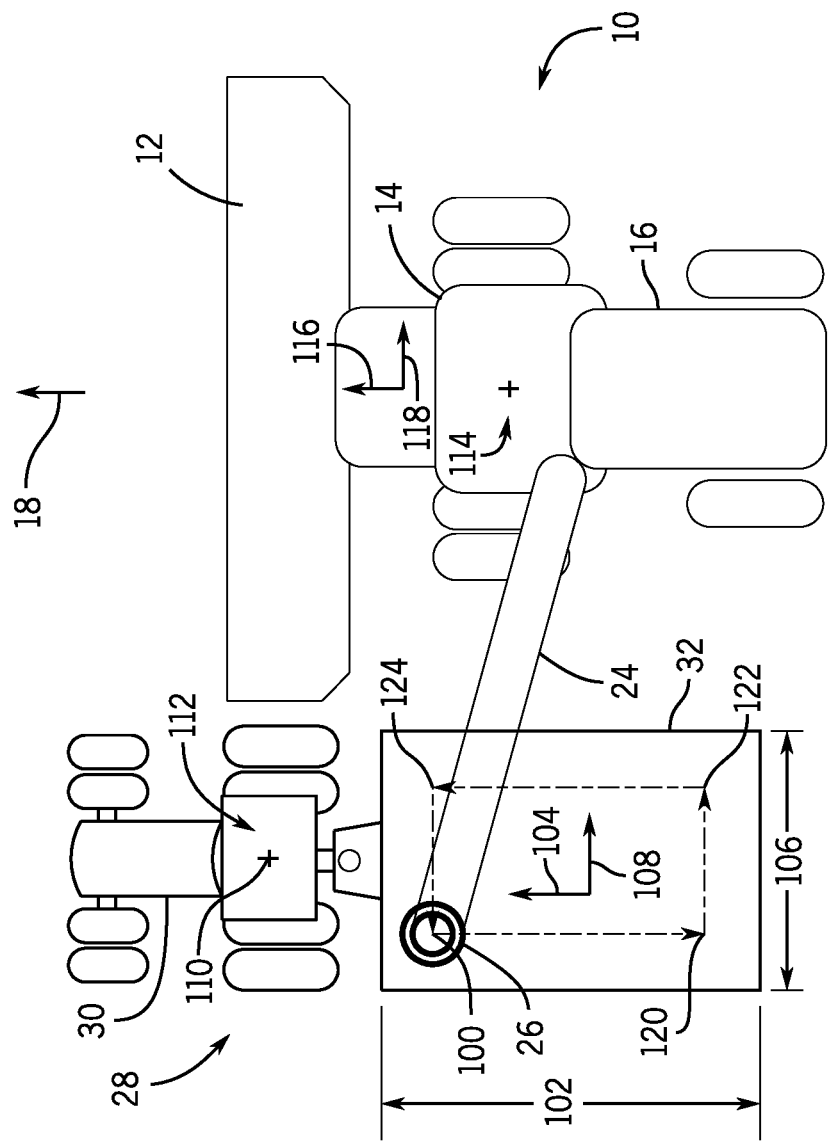
FIG. 3 is a schematic diagram of the agricultural harvester and the agricultural product transportation system of FIG. 1.

FIG. 3 is a schematic diagram of the agricultural harvester 10 and the agricultural product transportation system 28 of FIG. 1. In certain embodiments, the harvester controller is configured to determine a first unloading point 100 within the storage compartment 32 based at least in part on dimensions of the storage compartment. The first unloading point corresponds to a first target position of the outlet 26 of the conveyor 24 relative to the storage compartment 32. The dimensions of the storage compartment 32 may include a length 102 along a longitudinal axis 104 of the storage compartment 32 (e.g., parallel to the direction of travel 18) and a width 106 along a lateral axis 108 of the storage compartment 32 (e.g., perpendicular to the direction of travel 18). While the illustrated storage compartment 32 is rectangular, in other embodiments, the storage compartment may have another suitable shape, such as square, polygonal, or elliptical, among other suitable shapes. In such embodiments, the dimensions of the storage compartment may be based on the shape of the storage compartment. Furthermore, in certain embodiments, the harvester controller may determine the first unloading point 100 based on a target distance between the first unloading point and the edge of the storage compartment. The target distance may be selected to substantially reduce the possibility of the agricultural product flowing to the surface of the field instead of the interior of the storage compartment. The target distance may also be selected such that the first unloading point 100 is positioned within the bounding shape (e.g., bounding rectangle). The harvester controller may also determine the first unloading point based on other suitable factors, such as the diameter of the conveyor outlet, the length of the conveyor, other suitable factor(s), or a combination thereof. While the harvester controller determines the first unloading point in the illustrated embodiment, in other embodiments, the first unloading point may be stored in the memory of the controller, received from the user interface, received from a remote terminal, received from another suitable source, or a combination thereof.

The harvester controller is also configured to determine a first target position 110 of the haul vehicle 30 relative to the harvester 10 based at least in part on the first unloading point 100. As illustrated, the outlet 26 of the conveyor 24 is aligned with the first unloading point 100 while the haul vehicle 30 is positioned at the first target position 110. The first target position 110 corresponds to a first target position of a reference point 112 on the haul vehicle 30 relative to a reference point 114 on the harvester 10. With the haul vehicle positioned at the first target position, the reference points are offset along a longitudinal axis 116 of the harvester and along a lateral axis 118 of the harvester. Each reference point may correspond to the location of a spatial locating antenna on the respective vehicle. Accordingly, the first target position of the haul vehicle 30 may correspond to a first target position of the haul vehicle spatial locating antenna relative to the harvester spatial locating antenna. In other embodiments, the reference point 112 on the haul vehicle and/or the reference point 114 on the harvester may be located at another suitable position on the respective vehicle. In certain embodiments, the harvester controller may be configured to determine the first target position based on a length of the conveyor, a width of the haul vehicle, a width of the storage compartment, a width of the harvester, other suitable parameter(s), or a combination thereof.

In certain embodiments, the harvester controller is configured to output a first control signal to the haul vehicle controller indicative of instructions to direct the haul vehicle to the first target position, as illustrated. The haul vehicle controller may be configured to output respective control signals to the steering control system and/or the speed control system indicative of instructions to move the haul vehicle to the first target position in response to receiving the first control signal from the harvester controller. In certain embodiments, the harvester controller is also configured to determine a second unloading point 120 within the storage compartment 32 based at least in part on the dimensions of the storage compartment. The second unloading point corresponds to a second target position of the outlet 26 of the conveyor 24 relative to the storage compartment 32. Furthermore, in certain embodiments, the harvester controller may determine the second unloading point 120 based on a target distance between the second unloading point and the edge of the storage compartment. The target distance may be selected to substantially reduce the possibility of the agricultural product flowing to the surface of the field instead of the interior of the storage compartment. The target distance may also be selected such that the second unloading point 120 is positioned within the bounding shape (e.g., bounding rectangle). The harvester controller may also determine the second unloading point based on other suitable factors, such as the diameter of the conveyor outlet, the length of the conveyor, other suitable factor(s), or a combination thereof. While the harvester controller determines the second unloading point in the illustrated embodiment, in other embodiments, the second unloading point may be stored in the memory of the controller, received from the user interface, received from a remote terminal, received from another suitable source, or a combination thereof.

In addition, the harvester controller is configured to determine a second target position of the haul vehicle 30 relative to the harvester 10 based at least in part on the second unloading point 120. While the haul vehicle 30 is positioned at the second target position, the outlet 26 of the conveyor 24 is aligned with the second unloading point 120. The second target position corresponds to a second target position of the reference point 112 on the haul vehicle 30 relative to the reference point 114 on the harvester 10. With the haul vehicle positioned at the second target position, the reference points are offset along the longitudinal axis 116 of the harvester and along the lateral axis 118 of the harvester. In certain embodiments, the harvester controller may be configured to determine the second target position based on the length of the conveyor, the width of the haul vehicle, the width of the storage compartment, the width of the harvester, other suitable parameter(s), or a combination thereof.

The harvester controller is also configured to determine a first target speed between the first target position and the second target position based at least in part on a flow rate of the agricultural product through the conveyor. The first target speed may be selected to establish a substantially even distribution of the agricultural product (e.g., at a target level) along the path between the first unloading point and the second unloading point. For example, the harvester controller may determine a higher first target speed for a higher flow rate, and the harvester controller may determine a lower first target speed for a lower flow rate. The harvester controller may determine the flow rate of the agricultural product through the conveyor based on feedback from the flow meter (e.g., mounted on the conveyor), feedback from the non-contact sensor, feedback from another suitable sensor, or a combination thereof. Furthermore, a user may input the flow rate to the harvester controller via the user interface, the flow rate may be received from a remote source (e.g., remote terminal, etc.), the flow rate may be stored within the memory of the harvester controller, or a combination thereof. In addition, the harvester controller may determine the first target speed based on particle size of the agricultural product, the tendency of the agricultural product to clump, other suitable factor(s), or a combination thereof. The harvester controller is configured to output a second control signal to the haul vehicle controller indicative of instructions to direct the haul vehicle from the first target position to the second target position at the first target speed. The haul vehicle controller may be configured to output respective control signals to the steering control system and/or the speed control system indicative of instructions to move the haul vehicle to the second target position at the first target speed in response to receiving the second control signal from the harvester controller.

In certain embodiments, the control system (e.g., the harvester control system, the haul vehicle control system, or a combination of the haul vehicle control system and the harvester control system) does not include a sensor configured to determine a level of the agricultural product within the storage compartment. In addition, the control system (e.g., the harvester control system, the haul vehicle control system, or a combination of the haul vehicle control system and the harvester control system) does not include a sensor configured to determine a profile of the agricultural product within the storage compartment. Accordingly, the harvester controller may determine the flow rate (e.g., based on feedback from the flow meter), without input from a level/profile senor, or the harvester controller may receive or access a stored flow rate without input from a level/profile sensor.

In certain embodiments, the harvester controller is configured to reduce the first target speed before outputting the second control signal. For example, the harvester controller may determine whether the first target speed is greater than a threshold speed. The threshold speed may correspond to a maximum speed of the haul vehicle (e.g., due to gear selection, maximum engine output, maximum engine rotation speed, etc.). In response to determining that the first target speed is greater than the threshold speed, the harvester controller may output a third control signal to the product delivery system indicative of instructions to reduce the flow rate of the agricultural product through the conveyor. In addition, in response to determining that the first target speed is greater than the threshold speed, the harvester controller may reduce the first target speed to the threshold speed before outputting the second control signal. Reducing the flow rate of the agricultural product through the conveyor establishes a target level of agricultural product within the storage compartment (e.g., along the path between the first and second unloading points).

In certain embodiments, the harvester controller is configured to instruct the haul vehicle to move cyclically between the first and second target position, thereby enhancing the distribution of the agricultural product within the storage compartment. For example, the first and second unloading points, which correspond to the first and second target positions, may be positioned at opposite longitudinal ends of the storage compartment and substantially laterally centered along the width of the storage compartment. In certain embodiments, the cyclic motion may include a single cycle from the first target position/first unloading point to the second target position/second unloading point, and then back to the first target position/first unloading point. However, in other embodiment, the cyclic motion may include multiple cycles (e.g., 2, 3, 4, 5, 6, or more). In certain embodiments, the harvester controller is configured to output a control signal indicative of instructions to direct the haul vehicle from the second target position to the first target position at the first target speed. However, in other embodiments, the harvester controller is configured to determine a second target speed between the second target position and the first target position based at least in part on the flow rate of the agricultural product through the conveyor. In such embodiments, the harvester controller is configured to output a fourth control signal indicative of instructions to direct the haul vehicle from the second target position to the first target position at the second target speed. If the cyclic motion includes multiple cycles, the harvester controller may then output the first control signal indicative of instructions to direct the haul vehicle to the first target position (e.g., at the first target speed), and the process may repeat.

In certain embodiments, the harvester controller is configured to instruct the haul vehicle to move along a route between a pattern of unloading points. For example, the harvester controller may determine a third unloading point 122 within the storage compartment (e.g., within the bounding shape) based at least in part on the dimensions of the storage compartment. In other embodiments, the third unloading point may be stored in the memory of the controller, received from the user interface, received from a remote terminal, received from another suitable source, or a combination thereof. In addition, the harvester controller is configured to determine a third target position of the haul vehicle relative to the harvester based at least in part on the third unloading point. While the haul vehicle is positioned at the third target position, the outlet of the conveyor is aligned with the third unload point. In certain embodiments, the harvester controller is configured to determine a third target speed between the second target position and the third target position based at least in part on the flow rate of the agricultural product through the conveyor, and the harvester controller is configured to output a fifth control signal indictive of instructions to direct the haul vehicle from the second target position to the third target position at the third target speed. In other embodiments, the harvester controller is configured to output the fifth control signal indictive of instructions to direct the haul vehicle from the second target position to the third target position at the first target speed.

The harvester controller may determine a fourth unloading point 124 within the storage compartment (e.g., within the bounding shape) based at least in part on the dimensions of the storage compartment. In other embodiments, the fourth unloading point may be stored in the memory of the controller, received from the user interface, received from a remote terminal, received from another suitable source, or a combination thereof. In addition, the harvester controller may determine a fourth target position of the haul vehicle relative to the harvester based at least in part on the fourth unloading point. While the haul vehicle is positioned at the fourth target position, the outlet of the conveyor is aligned with the fourth unload point. In certain embodiments, the harvester controller is configured to determine a fourth target speed between the third target position and the fourth target position based at least in part on the flow rate of the agricultural product through the conveyor, and the harvester controller is configured to output a sixth control signal indictive of instructions to direct the haul vehicle from the third target position to the fourth target position at the fourth target speed. In other embodiments, the harvester controller is configured to output the sixth control signal indictive of instructions to direct the haul vehicle from the third target position to the fourth target position at the first target speed. In certain embodiments, the harvester controller is configured to output the first control signal indicative of instructions to direct the haul vehicle from the fourth target position to the first target position (e.g., at the first target speed, at a fifth target speed, etc.), thereby completing the route through the rectangular pattern of unloading points within the storage compartment.

The route of movement between unloading points within the storage compartment may repeat (e.g., 2, 3, 4, 5, or 6 times, or more). Furthermore, while the pattern of unloading points is rectangular in the illustrated embodiment, in other embodiments, the unloading points may be arranged in any other suitable pattern (e.g., polygonal, square, zig-zag, random, etc.). In addition, the pattern may include any suitable number of unloading points (e.g., 2, 3, 4, 5, 6, 7, 8, 9, 10, or more). Furthermore, each unloading point may be located in any suitable position within the storage compartment. For example, at least two unloading points may be laterally offset from one another, at least two unloading points may be longitudinally offset from one another, or a combination thereof. As a result, the corresponding target positions may be laterally and/or longitudinally offset from one another. In certain embodiments, each unloading point (e.g., the position of each unloading point) may be determined based on the geometry of the storage compartment. For example, one unloading point may be positioned proximate to each corner of a rectangular storage compartment. In addition, for a polygonal storage compartment, an unloading point may be positioned proximate to each vertex of the storage compartment. Furthermore, in certain embodiments, at least one unloading point (e.g., the position of at least one unloading point) may be determined based at least in part on the dimensions and/or the geometry of the bounding shape (e.g., bounding rectangle). Because the bounding shape is determined based at least in part on the dimensions of the storage compartment (e.g., such that the bounding shape fits within the storage compartment), any unloading points determined based at least in part on the dimensions/geometry of the bounding shape are determined based at least in part on the dimensions of the storage compartment.

Furthermore, the process of reducing the flow rate of the agricultural product through the conveyor and reducing the target speed to the threshold speed in response to determining that the target speed is greater than the threshold speed is discussed above with reference to the first target speed. However, in certain embodiments, the process may be applied to the other target speeds. For example, in response to determining that the second, third, fourth, or fifth target speed is greater than the threshold speed, the harvester controller may output a respective control signal to the product delivery system indicative of instructions to reduce the flow rate of the agricultural product through the conveyor, and the harvester controller may reduce the respective target speed to the threshold speed before outputting the respective haul vehicle movement control signal. In addition, in certain embodiments, the harvester controller may establish a dwell time at each unloading point. For example, in response to the conveyor outlet reaching an unloading point, the harvester controller may delay movement of the conveyor outlet to the next unloading point in the pattern for a dwell time (e.g., delay movement of the haul vehicle to the next target position for the dwell time). The dwell time may be any time suitable for enhancing the distribution of the agricultural product within the storage compartment (e.g., 0, 1, 5, 10, 20, 30, 60, 120, or 180 seconds, or more).

In certain embodiments, the harvester controller is configured to determine a first expected duration of traversing a first distance between the first target position 110 of the haul vehicle 30 relative to the harvester 10 and the second target position of the haul vehicle 30 relative to the harvester 10. As previously discussed, the outlet 26 of the conveyor 24 is aligned with the first unloading point 100 within the storage compartment 32 while the haul vehicle is positioned at the first target position 110, and the outlet 26 of the conveyor 24 is aligned with the second unloading point 120 within the storage compartment 32 while the haul vehicle 30 is positioned at the second target position. In certain embodiments, the harvester controller is configured to determine the first expected duration of traversing the first distance based on at least one performance characteristic of the haul vehicle 30. The performance characteristic may include a maximum engine output of the engine of the haul vehicle, a maximum braking force of the braking system of the haul vehicle, a minimum turning radius of the haul vehicle, other suitable parameter(s), or a combination thereof.

For example, if the second target position is positioned forward of the first target position relative to the harvester 10 along the longitudinal axis 116, the harvester controller may instruct the engine output control system of the haul vehicle (e.g., via the interfaces and the haul vehicle controller) to increase the speed of the haul vehicle. As a result, the storage compartment 32 moves forwardly relative to the harvester 10 along the longitudinal axis 116. Based at least in part on the maximum engine output of the engine, the harvester controller may determine the expected duration of traversing the first distance between the first target position and the second target position. Furthermore, if the second target position is positioned rearward of the first target position relative to the harvester 10 along the longitudinal axis 116, the harvester controller may instruct the braking control system of the haul vehicle (e.g., via the interfaces and the haul vehicle controller) to reduce the speed of the haul vehicle. As a result, the storage compartment 32 moves rearwardly relative to the harvester 10 along the longitudinal axis 116. Based at least in part on the maximum braking force of the braking system, the harvester controller may determine the expected duration of traversing the first distance between the first target position and the second target position. In addition, if the second target position is offset from the first target position along the lateral axis 118, the harvester controller may instruct the steering control system of the haul vehicle (e.g., via the interfaces and the haul vehicle controller) to laterally move the haul vehicle. Based at least in part on the minimum turning radius of the haul vehicle, the harvester controller may determine the expected duration of traversing the first distance between the first target position and the second target position.

In addition, as previously discussed, in certain embodiments, the harvester controller is configured to determine a target speed between target positions based on the flow rate of the agricultural product through the conveyor. In such embodiments, the harvester controller may determine the expected duration of traversing the distance between target positions based at least in part on the determined target speed. Furthermore, in certain embodiments, the harvester controller may determine the expected duration of traversing the distance between target positions based at least in part on dynamics of the haul vehicle. For example, the expected duration may be determined based at least in part on feedback from the haul vehicle orientation sensor at the time of the determination (e.g., pitch angle, yaw angle, roll angle, pitch rate, yaw rate, roll rate, etc.). In addition, the expected duration may be determined based on expected haul vehicle dynamics, which may be based on terrain, wind, other suitable factor(s), or a combination thereof.

In addition, the harvester controller is configured to determine a first target time for reaching the second target position based at least in part on the flow rate of the agricultural product through the conveyor. As previously discussed, the harvester controller may determine the flow rate of the agricultural product through the conveyor based on feedback from the flow meter (e.g., mounted on the conveyor), feedback from the non-contact sensor, feedback from another suitable sensor, or a combination thereof. Furthermore, a user may input the flow rate to the harvester controller via the user interface, the flow rate may be received from a remote source (e.g., remote terminal, etc.), the flow rate may be stored within the memory of the harvester controller, or a combination thereof. In addition, the harvester controller may determine the first target time based on particle size of the agricultural product, the tendency of the agricultural product to clump, other suitable factor(s), or a combination thereof.

In certain embodiments, the control system (e.g., the harvester control system, the haul vehicle control system, or a combination of the haul vehicle control system and the harvester control system) does not include a sensor configured to determine a level of the agricultural product within the storage compartment. In addition, the control system (e.g., the harvester control system, the haul vehicle control system, or a combination of the haul vehicle control system and the harvester control system) does not include a sensor configured to determine a profile of the agricultural product within the storage compartment. Accordingly, the harvester controller may determine the flow rate (e.g., based on feedback from the flow meter), without input from a level/profile senor, or the harvester controller may receive or access a stored flow rate without input from a level/profile sensor.

The harvester controller is configured to determine a first initiation time for initiating movement from the first target position to the second target position. The first initiation time corresponds to the first target time minus the first expected duration. In addition, the harvester controller is configured to output a first control signal indicative of instructions to direct the haul vehicle from the first target position to the second target position at the first initiation time. That is, the first control signal is output at the first initiation time. In certain embodiments, the harvester controller is configured to output the first control signal to the steering control system of the haul vehicle and/or to the speed control system of the haul vehicle (e.g., via the transceivers and the haul vehicle controller). Because the first control signal is output at the first initiation time, the haul vehicle may arrive at the second target position substantially at the target time. As a result, the agricultural product may be substantially evenly distributed throughout the storage compartment (e.g., as compared to a system in which the haul vehicle is instructed to move without consideration of the expected duration of the move).

As previously discussed, the harvester controller may instruct the haul vehicle to move cyclically between the first and second target positions, thereby enhancing the distribution of the agricultural product within the storage compartment. In certain embodiments, the harvester controller is configured to determine a second expected duration of traversing the first distance from the second target position of the haul vehicle relative to the harvester to the first target position of the haul vehicle relative to the harvester. In addition, the harvester controller is configured to determine a second target time for reaching the first target position based at least in part on the flow rate of the agricultural product through the conveyor. The harvester controller is also configured to output a second control signal indicative of instructions to direct the haul vehicle from the second target position to the first target position at a second initiation time. The second initiation time corresponds to the second target time minus the second expected duration. If the cyclic motion includes multiple cycles, the harvester controller may then determine the first expected duration, determine the first target time, and output the first control signal.

In certain embodiments, the harvester controller is configured to instruct the haul vehicle to move along a route between a pattern of unloading points. For example, in certain embodiments, the harvester controller is configured to determine a third expected duration of traversing a second distance between the second target position of the haul vehicle relative to the harvester and the third target position of the haul vehicle relative to the harvester. As previously discussed, the outlet 26 of the conveyor 24 is aligned with the third unloading point 122 within the storage compartment 32 while the haul vehicle 30 is positioned at the third target position. The harvester controller is also configured to determine a third target time for reaching the third target position based at least in part on the flow rate of the agricultural product through the conveyor. In addition, the harvester controller is configured to output a third control signal indicative of instructions to direct the haul vehicle from the second target position to the third target position at a third initiation time, in which the third initiation time corresponds to the third target time minus the third expected duration.

Furthermore, in certain embodiments, the harvester controller is configured to determine a fourth expected duration of traversing a third distance between the third target position of the haul vehicle relative to the harvester and the fourth target position of the haul vehicle relative to the harvester. As previously discussed, the outlet 26 of the conveyor 24 is aligned with the fourth unloading point 124 within the storage compartment 32 while the haul vehicle 30 is positioned at the fourth target position. The harvester controller is also configured to determine a fourth target time for reaching the fourth target position based at least in part on the flow rate of the agricultural product through the conveyor. In addition, the harvester controller is configured to output a fourth control signal indicative of instructions to direct the haul vehicle from the third target position to the fourth target position at a fourth initiation time, in which the fourth initiation time corresponds to the fourth target time minus the fourth expected duration. In certain embodiments, the harvester controller is configured to repeat the process described above for determining an initiation time that causes the haul vehicle to reach the first target position 110 substantially at a target time and to output a control signal indicative of instructions to direct the haul vehicle from the fourth target position to the first target position at the initiation time, thereby completing the route through the rectangular pattern of unloading points within the storage compartment.

While the processes (e.g., determinations, outputting control signals, etc.) described above are performed by the harvester controller in the illustrated embodiment, in other embodiments, the processes may be performed by the haul vehicle controller, another suitable controller, or a combination of controllers. For example, certain process steps may be performed by the haul vehicle controller, and other process steps may be performed by the harvester controller. Furthermore, while the coordinate system for the positions (e.g., target positions) of the haul vehicle has an origin at the harvester reference point 114 and moves with the harvester 10 in the illustrated embodiment, in other embodiments, the coordinate system may be fixed to the field. For example, the coordinate system may be a fixed global coordinate system. In embodiments that utilize a fixed coordinate system, each position (e.g., target position) of the haul vehicle within the fixed coordinate system may be determined based on the position of the haul vehicle relative to the harvester and the position of the harvester within the fixed coordinate system (e.g., as determined based on feedback from the spatial locating device mounted to the harvester).

Figure 4:
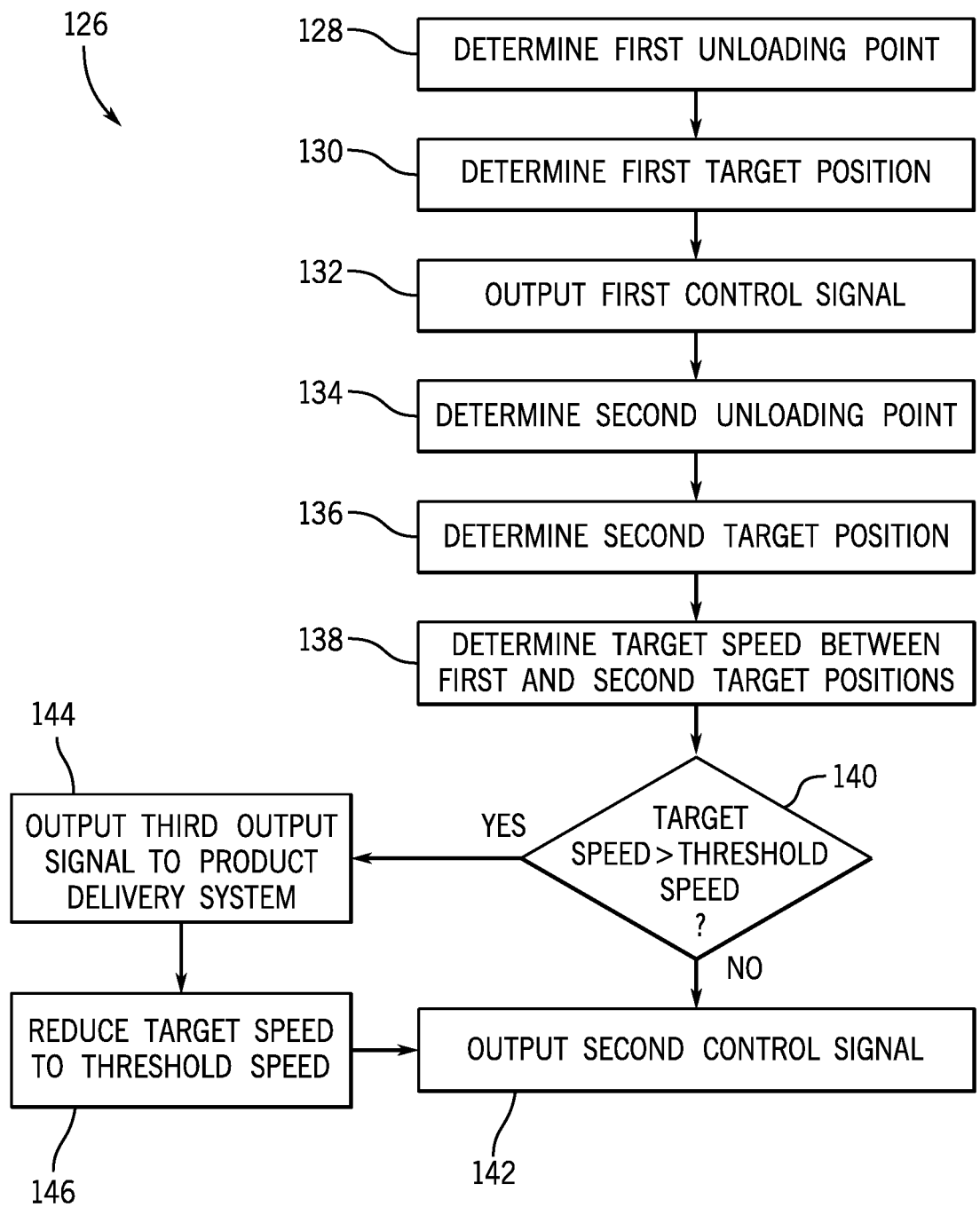
FIG. 4 is a flow diagram of an embodiment of a method for controlling movement of a haul vehicle relative to a harvester.

FIG. 4 is a flow diagram of an embodiment of a method 126 for controlling movement of a haul vehicle relative to a harvester. First, as represented by block 128, a first unloading point within a storage compartment is determined based at least in part on dimensions of the storage compartment. As previously discussed, in certain embodiments, the first unloading point may be stored in the memory of a controller, received from a user interface, received from a remote terminal, received from another suitable source, or a combination thereof. In such embodiments, the step of determining the first unloading point may be omitted. Next, as represented by block 130, a first target position of the haul vehicle relative to the harvester is determined based at least in part on the first unloading point. As previously discussed, an outlet of a conveyor of the harvester is aligned with the first unloading point while the haul vehicle is positioned at the first target position. A first control signal indicative of instructions to direct the haul vehicle to the first target position is then output, as represented by block 132.

As represented by block 134, a second unloading point within the storage compartment is determined based at least in part on the dimensions of the storage compartment. As previously discussed, in certain embodiments, the second unloading point may be stored in the memory of a controller, received from a user interface, received from a remote terminal, received from another suitable source, or a combination thereof. In such embodiments, the step of determining the second unloading point may be omitted. Next, as represented by block 136, a second target position of the haul vehicle relative to the harvester is determined based at least in part on the second unloading point. As previously discussed, the outlet of the conveyor of the harvester is aligned with the second unloading point while the haul vehicle is positioned at the second target position. As represented by block 138, a target speed (e.g., first target speed) between the first target position and the second target position is determined based at least in part on a flow rate of agricultural product through the conveyor. The target speed may be selected to establish a substantially even distribution of the agricultural product (e.g., at a target level) along a path between the first unloading point and the second unloading point.

Next, as represented by block 140, a determination is made regarding whether the target speed is greater than a threshold speed. The threshold speed may correspond to a maximum speed of the haul vehicle (e.g., due to gear selection, maximum engine output, maximum engine rotation speed, etc.). In response to determining that the target speed is not greater than the threshold speed, a second control signal indicative of instructions to direct the haul vehicle from the first target position to the second target position at the target speed is output, as represented by block 142. In response to determining that the target speed is greater than the threshold speed, a third control signal indicative of instructions to reduce the flow rate of the agricultural product through the conveyor is output, as represented by block 144. In addition, the target speed is reduced to the threshold speed, as represented by block 146, before the second control signal is output, as represented by block 142. Reducing the flow rate of the agricultural product through the conveyor establishes a target level of agricultural product within the storage compartment (e.g., along the path between the first and second unloading points). Furthermore, in certain embodiments, the method may include instructing the haul vehicle to move cyclically between the first and second target positions, as discussed above with reference to FIG. 3. In addition, in certain embodiments, the method may include instructing the haul vehicle to move between additional target positions, as discussed above with reference to FIG. 3.

The steps of the method 126 may be performed in the order disclosed herein or in any other suitable order. In addition, in certain embodiments, the method 126 is performed by the controller of the agricultural harvester. However, in other embodiments, the method 126 may be performed by any other suitable controller of the control system (e.g., a combination of the haul vehicle control system and the agricultural harvester control system), such as the haul vehicle controller, or any combination of controllers of the control system (e.g., a combination of the haul vehicle control system and the agricultural harvester control system), such as the haul vehicle controller and the harvester controller.

Figure 5:
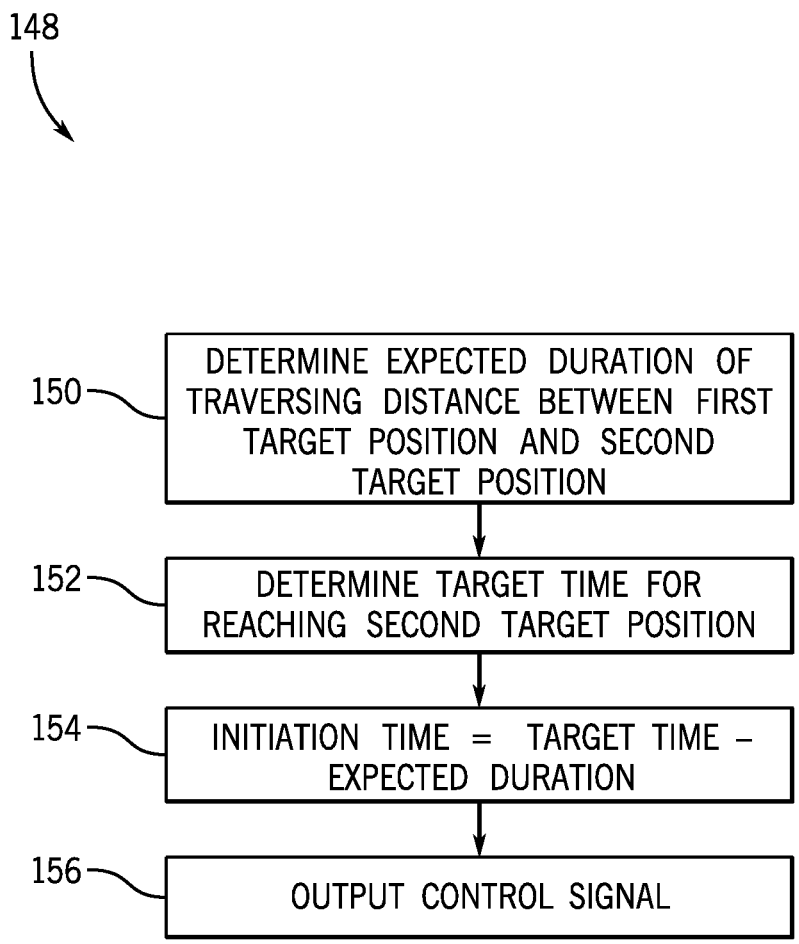
FIG. 5 is a flow diagram of another embodiment of a method for controlling movement of a haul vehicle relative to a harvester.

FIG. 5 is a flow diagram of another embodiment of a method 148 for controlling movement of a haul vehicle relative to a harvester. First, as represented by block 150, an expected duration (e.g., first expected duration) of traversing a distance (e.g., first distance) between a first target position of the haul vehicle relative to the harvester and a second target position of the haul vehicle relative to the harvester is determined. As previously discussed, an outlet of a conveyor of the harvester is aligned with a first unloading point within the storage compartment while the haul vehicle is positioned at the first target position, and the outlet of the conveyor is aligned with a second unloading point within the storage compartment while the haul vehicle is positioned at the second target position. Next, a target time (e.g., first target time) for reaching the second target position is determined based at least in part on a flow rate of agricultural product through the conveyor, as represented by block 152. As represented by block 154, an initiation time (e.g., first initiation time) is determined, in which the initiation time corresponds to the target time minus the expected duration. An output signal (e.g., first output signal) indicative of instructions to direct the haul vehicle from the first target position to the second target position is then output at the initiation time, as represented by block 156. Accordingly, the haul vehicle may arrive at the second target position substantially at the target time. As a result, the agricultural product may be substantially evenly distributed throughout the storage compartment (e.g., as compared to a system in which the haul vehicle is instructed to move without consideration of the expected duration of the move). Furthermore, in certain embodiments, the method may include instructing the haul vehicle to move cyclically between the first and second target positions, as discussed above with reference to FIG. 3. In addition, in certain embodiments, the method may include instructing the haul vehicle to move between additional target positions, as discussed above with reference to FIG. 3.

The steps of the method 148 may be performed in the order disclosed herein or in any other suitable order. In addition, in certain embodiments, the method 148 is performed by the controller of the agricultural harvester. However, in other embodiments, the method 148 may be performed by any other suitable controller of the control system (e.g., a combination of the haul vehicle control system and the agricultural harvester control system), such as the haul vehicle controller, or any combination of controllers of the control system (e.g., a combination of the haul vehicle control system and the agricultural harvester control system), such as the haul vehicle controller and the harvester controller.

While the control systems are described herein with reference to an agricultural harvester and a mobile storage compartment (e.g., towed by a haul vehicle), the control systems may be utilized for other agricultural and/or non-agricultural applications. For example, the control systems described herein may be employed to automatically dock the mobile storage compartment with an on-road transport vehicle, such as a commercial truck, thereby facilitating efficient transfer of the agricultural product to the transport vehicle. Moreover, the control systems described herein may be utilized to automatically dock a haul vehicle (e.g., dump truck) with a mining vehicle, thereby enabling the mining vehicle to efficiency unload ore or other materials.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A control system comprising a controller having a memory and a processor, wherein the controller is configured to:
   determine a first target speed between a first target position of a haul vehicle relative to a harvester and a second target position of the haul vehicle relative to the harvester based at least in part on a flow rate of agricultural product through a conveyor of the harvester, wherein the haul vehicle is coupled to a storage compartment and configured to move the storage compartment through a field, an outlet of the conveyor is aligned with a first unloading point within the storage compartment while the haul vehicle is positioned at the first target position, and the outlet of the conveyor is aligned with a second unloading point within the storage compartment while the haul vehicle is positioned at the second target position; and
   output a first control signal indicative of instructions to direct the haul vehicle from the first target position to the second target position at the first target speed.

2. The control system of claim 1, wherein the controller is configured to:
   determine whether the first target speed is greater than a threshold speed;
   output a second control signal to a product delivery system indictive of instructions to reduce the flow rate of the agricultural product in response to determining that the first target speed is greater than the threshold speed, wherein the product delivery system is configured to control flow of the agricultural product through the conveyor; and
   reduce the first target speed to the threshold speed before outputting the first control signal in response to determining that the first target speed is greater than the threshold speed.

3. The control system of claim 1, wherein the control system does not comprise a sensor configured to determine a level of the agricultural product within the storage compartment, and the control system does not comprise a sensor configured to determine a profile of the agricultural product within the storage compartment.

4. The control system of claim 1, wherein the first target position is longitudinally offset from the second target position.

5. The control system of claim 1, wherein the controller is configured to:
   determine a second target speed between the second target position of the haul vehicle and the first target position of the haul vehicle based at least in part on the flow rate of the agricultural product through the conveyor; and
   output a third control signal indicative of instructions to direct the haul vehicle from the second target position to the first target position at the second target speed.

6. The control system of claim 1, wherein the controller is configured to:
   determine a third target speed between the second target position of the haul vehicle and a third target position of the haul vehicle relative to the harvester based at least in part on the flow rate of the agricultural product through the conveyor, wherein the outlet of the conveyor is aligned with a third unloading point within the storage compartment while the haul vehicle is positioned at the third target position; and
   output a fourth control signal indicative of instructions to direct the haul vehicle from the second target position to the third target position at the third target speed.

7. The control system of claim 6, wherein the third target position is laterally offset from the second target position.

8. A control system comprising a controller having a memory and a processor, wherein the controller is configured to:
   determine a first unloading point within a storage compartment based at least in part on dimensions of the storage compartment;
   determine a first target position of a haul vehicle relative to a harvester based at least in part on the first unloading point, wherein the haul vehicle is coupled to the storage compartment and configured to move the storage compartment through a field, and an outlet of a conveyer of the harvester is aligned with the first unloading point while the haul vehicle is positioned at the first target position;
   output a first control signal indicative of instructions to direct the haul vehicle to the first target position;
   determine a second unloading point within the storage compartment based at least in part on the dimensions of the storage compartment;
   determine a second target position of the haul vehicle relative to the harvester based at least in part on the second unloading point, wherein the outlet of the conveyor is aligned with the second unloading point while the haul vehicle is positioned at the second target position;
   determine a first target speed between the first target position and the second target position based at least in part on a flow rate of agricultural product through the conveyor; and
   output a second control signal indicative of instructions to direct the haul vehicle from the first target position to the second target position at the first target speed.

9. The control system of claim 8, wherein the controller is configured to:
   determine whether the first target speed is greater than a threshold speed;
   output a third control signal to a product delivery system indictive of instructions to reduce the flow rate of the agricultural product in response to determining that the first target speed is greater than the threshold speed, wherein the product delivery system is configured to control flow of the agricultural product through the conveyor; and reduce the first target speed to the threshold speed before outputting the second control signal in response to determining that the first target speed is greater than the threshold speed.

10. The control system of claim 8, wherein the control system does not comprise a sensor configured to determine a level of the agricultural product within the storage compartment, and the control system does not comprise a sensor configured to determine a profile of the agricultural product within the storage compartment.

11. The control system of claim 8, wherein the controller is configured to:
determine a second target speed between the second target position and the first target position based at least in part on the flow rate of the agricultural product through the conveyor; and
output a fourth control signal indicative of instructions to direct the haul vehicle from the second target position to the first target position at the second target speed.

12. The control system of claim 8, wherein the controller is configured to:
determine a third unloading point within the storage compartment based at least in part on the dimensions of the storage compartment;
determine a third target position of the haul vehicle relative to the harvester based at least in part on the third unloading point, wherein the outlet of the conveyor is aligned with the third unloading point while the haul vehicle is positioned at the third target position;
determine a third target speed between the second target position and the third target position based at least in part on the flow rate of the agricultural product through the conveyor; and
output a fifth control signal indicative of instructions to direct the haul vehicle from the second target position to the third target position at the third target speed.

13. A control system comprising a controller having a memory and a processor, wherein the controller is configured to:
determine a first expected duration of traversing a first distance between a first target position of a haul vehicle relative to a harvester and a second target position of the haul vehicle relative to the harvester, wherein the haul vehicle is coupled to a storage compartment and configured to move the storage compartment through a field, an outlet of a conveyor of the harvester is aligned with a first unloading point within the storage compartment while the haul vehicle is positioned at the first target position, and the outlet of the conveyor is aligned with a second unloading point within the storage compartment while the haul vehicle is positioned at the second target position;
determine a first target time for reaching the second target position based at least in part on a flow rate of agricultural product through the conveyor; and
output a first control signal indicative of instructions to direct the haul vehicle from the first target position to the second target position at a first initiation time, wherein the first initiation time corresponds to the first target time minus the first expected duration.

14. The control system of claim 13, wherein the controller is configured to determine the first expected duration of traversing the first distance based on at least one performance characteristic of the haul vehicle.

15. The control system of claim 14, wherein the at least one performance characteristic of the haul vehicle comprises a maximum engine output of an engine of the haul vehicle, a maximum braking force of a braking system of the haul vehicle, a minimum turning radius of the haul vehicle, or a combination thereof.

16. The control system of claim 13, wherein the controller is configured to output the first control signal to a steering control system of the haul vehicle, to a speed control system of the haul vehicle, or a combination thereof.

17. The control system of claim 13, wherein the controller is configured to:
determine a second expected duration of traversing the first distance between the second target position of the haul vehicle relative to the harvester and the first target position of the haul vehicle relative to the harvester;
determine a second target time for reaching the first target position based at least in part on the flow rate of the agricultural product through the conveyor; and
output a second control signal indicative of instructions to direct the haul vehicle from the second target position to the first target position at a second initiation time, wherein the second initiation time corresponds to the second target time minus the second expected duration.

18. The control system of claim 13, wherein the controller is configured to:
determine a third expected duration of traversing a second distance between the second target position of the haul vehicle relative to the harvester and a third target position of the haul vehicle relative to the harvester, wherein the outlet of the conveyor is aligned with a third unloading point within the storage compartment while the haul vehicle is positioned at the third target position;
determine a third target time for reaching the third target position based at least in part on the flow rate of the agricultural product through the conveyor; and
output a third control signal indicative of instructions to direct the haul vehicle from the second target position to the third target position at a third initiation time, wherein the third initiation time corresponds to the third target time minus the third expected duration.

19. The control system of claim 13, wherein the control system does not comprise a sensor configured to determine a level of the agricultural product within the storage compartment, and the control system does not comprise a sensor configured to determine a profile of the agricultural product within the storage compartment.

20. The control system of claim 13, wherein the first target position is longitudinally offset from the second target position.

* * * * *